(12) United States Patent
Nakasone

(10) Patent No.: US 10,047,818 B2
(45) Date of Patent: Aug. 14, 2018

(54) DAMPING DEVICE

(71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/314,056

(22) PCT Filed: May 21, 2015

(86) PCT No.: PCT/JP2015/064570
§ 371 (c)(1),
(2) Date: Nov. 25, 2016

(87) PCT Pub. No.: WO2015/182468
PCT Pub. Date: Dec. 3, 2015

(65) Prior Publication Data
US 2017/0198780 A1 Jul. 13, 2017

(30) Foreign Application Priority Data

May 28, 2014 (JP) ................................ 2014-110171

(51) Int. Cl.
*F16F 13/00* (2006.01)
*E05F 5/02* (2006.01)

(52) U.S. Cl.
CPC .............. *F16F 13/005* (2013.01); *E05F 5/02* (2013.01); *E05F 5/022* (2013.01);
(Continued)

(58) Field of Classification Search
CPC .... F16F 7/12; F16F 7/125; F16F 7/126; F16F 13/005; F16F 2232/08; F16F 2224/025;
(Continued)

(56) References Cited

U.S. PATENT DOCUMENTS 2,046,612 A * 7/1936 Devereaux .............. E05F 5/025
16/85
2,540,630 A * 2/1951 Munro ................... B61G 11/14
16/85
(Continued)

FOREIGN PATENT DOCUMENTS

CN 102401055 A 4/2012
GB 2519252 A 4/2015
(Continued)

OTHER PUBLICATIONS

International Search Report (ISR) (PCT Form PCT/ISA/210), in PCT/JP2015/064570, dated Jul. 7, 2015.
(Continued)

*Primary Examiner* — Thomas J Williams
(74) *Attorney, Agent, or Firm* — McGinn I.P. Law Group, PLLC.

(57) ABSTRACT

A damping device has a pin member inserted slidably in a cylindrical case member. The bottom of the case member has: a hole forming section in which an insertion hole is formed; and a slit for allowing the hole forming section to be expanded and deformed. The outer peripheral surface of the pin member and/or the inner peripheral surface of the hole forming section has a tapered section tilted relative to the axial direction. The movement of the pin member of being pressed into the insertion hole from the inside causes the outer peripheral surface of the pin member and the inner peripheral surface of the hole forming section to slide on each other along the tapered section, and as a result, the insertion hole is expanded.

10 Claims, 8 Drawing Sheets

(52) U.S. Cl.
CPC ... *E05Y 2900/538* (2013.01); *F16F 2224/025* (2013.01); *F16F 2232/08* (2013.01); *F16F 2234/02* (2013.01); *F16F 2236/04* (2013.01)

(58) Field of Classification Search
CPC ..... F16F 2234/02; F16F 2236/04; E05F 5/02; E05F 5/022; E05F 5/025; E05F 5/06; E05F 5/08; E05Y 2900/538
USPC ..... 188/371–377; 16/63, 82, 85, 86 R, 86 B, 16/86 C; 213/221
See application file for complete search history.

(56) References Cited

U.S. PATENT DOCUMENTS

| | | | | |
|---|---|---|---|---|
| 2,683,015 | A * | 7/1954 | Campbell | F16F 3/10 267/140.11 |
| 4,753,152 | A * | 6/1988 | Baechler | F41A 1/08 188/371 |
| 9,212,512 | B2 * | 12/2015 | Nakasone | F16F 1/128 |
| 2012/0061891 | A1 | 3/2012 | Gao | |
| 2014/0305725 | A1 * | 10/2014 | Snede | B62D 25/12 180/69.2 |
| 2015/0176320 | A1 | 6/2015 | Nakasone | |

FOREIGN PATENT DOCUMENTS

| | | |
|---|---|---|
| JP | S 59-7939 U | 1/1984 |
| JP | H 11-265642 A | 9/1999 |
| WO | WO 2014/024353 A1 | 7/2016 |

OTHER PUBLICATIONS

Chinese Office Action dated Mar. 7, 2018, in corresponding Chinese Application No. 201580028093.1, with an English translation thereof.

* cited by examiner

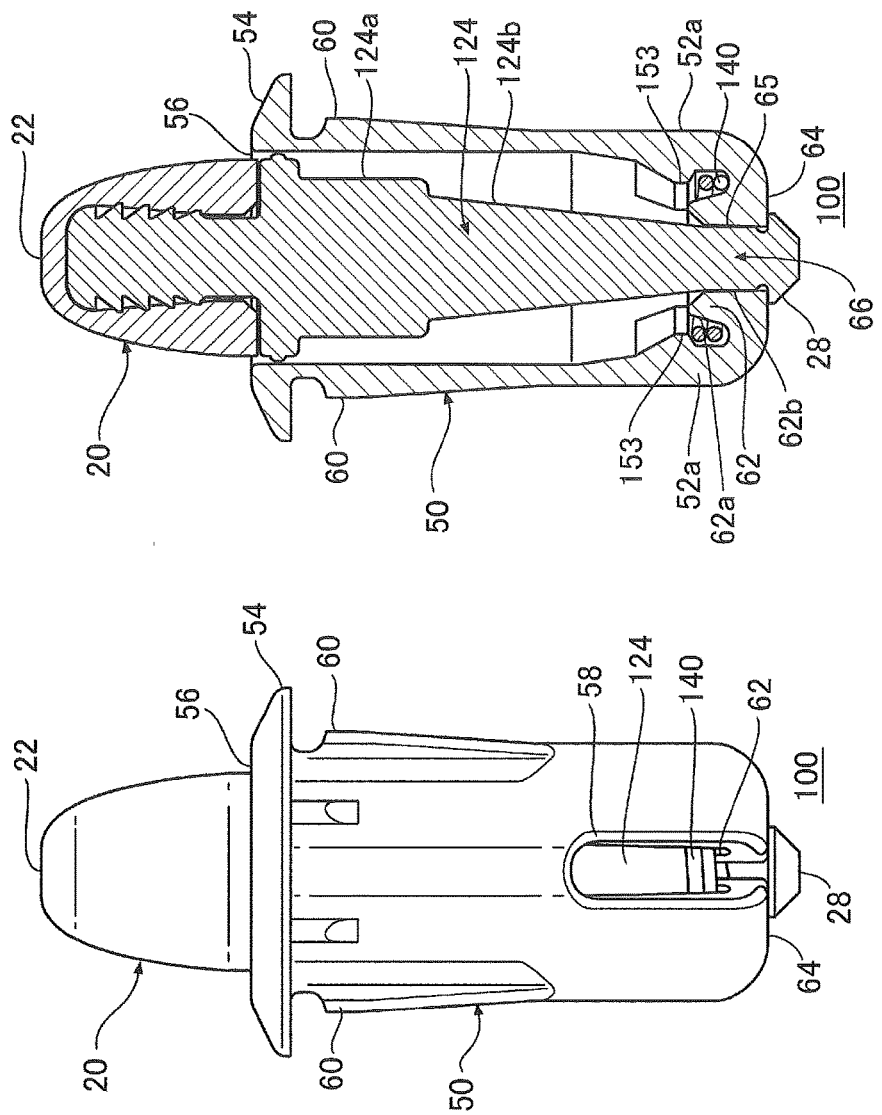

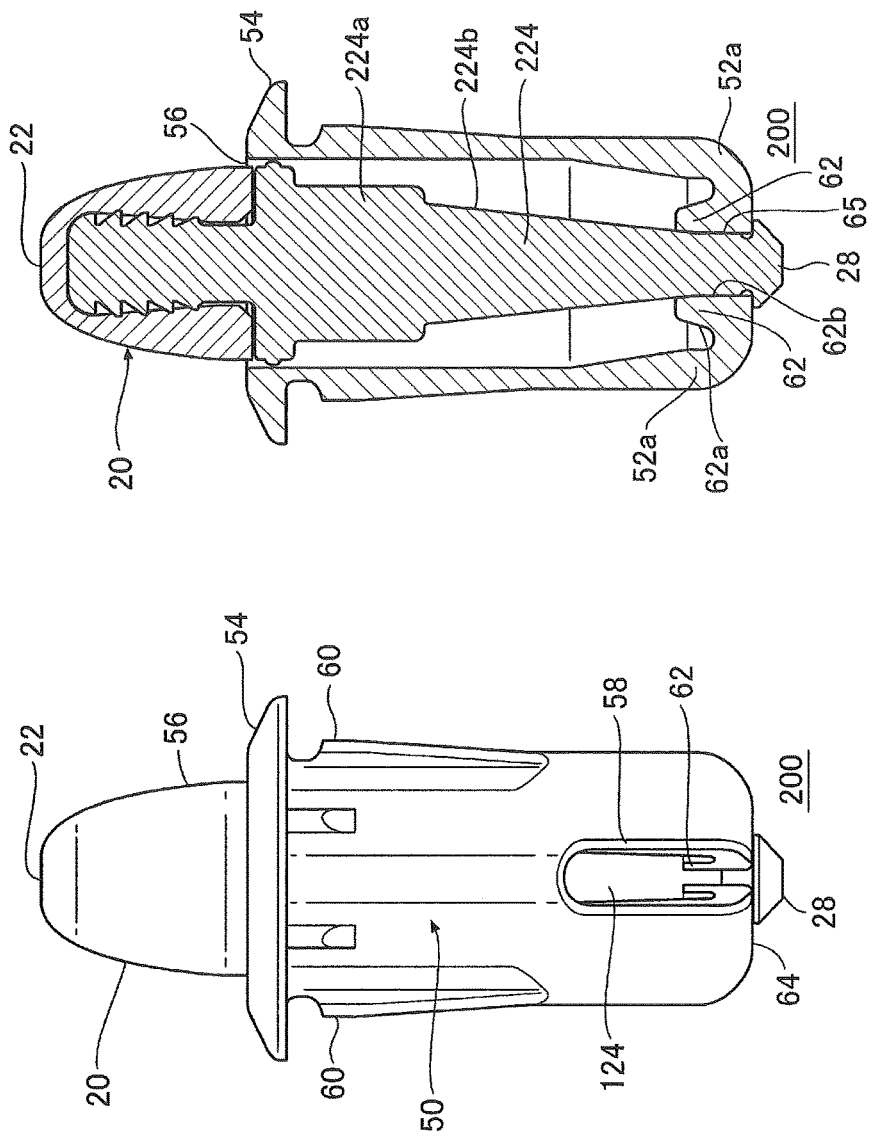

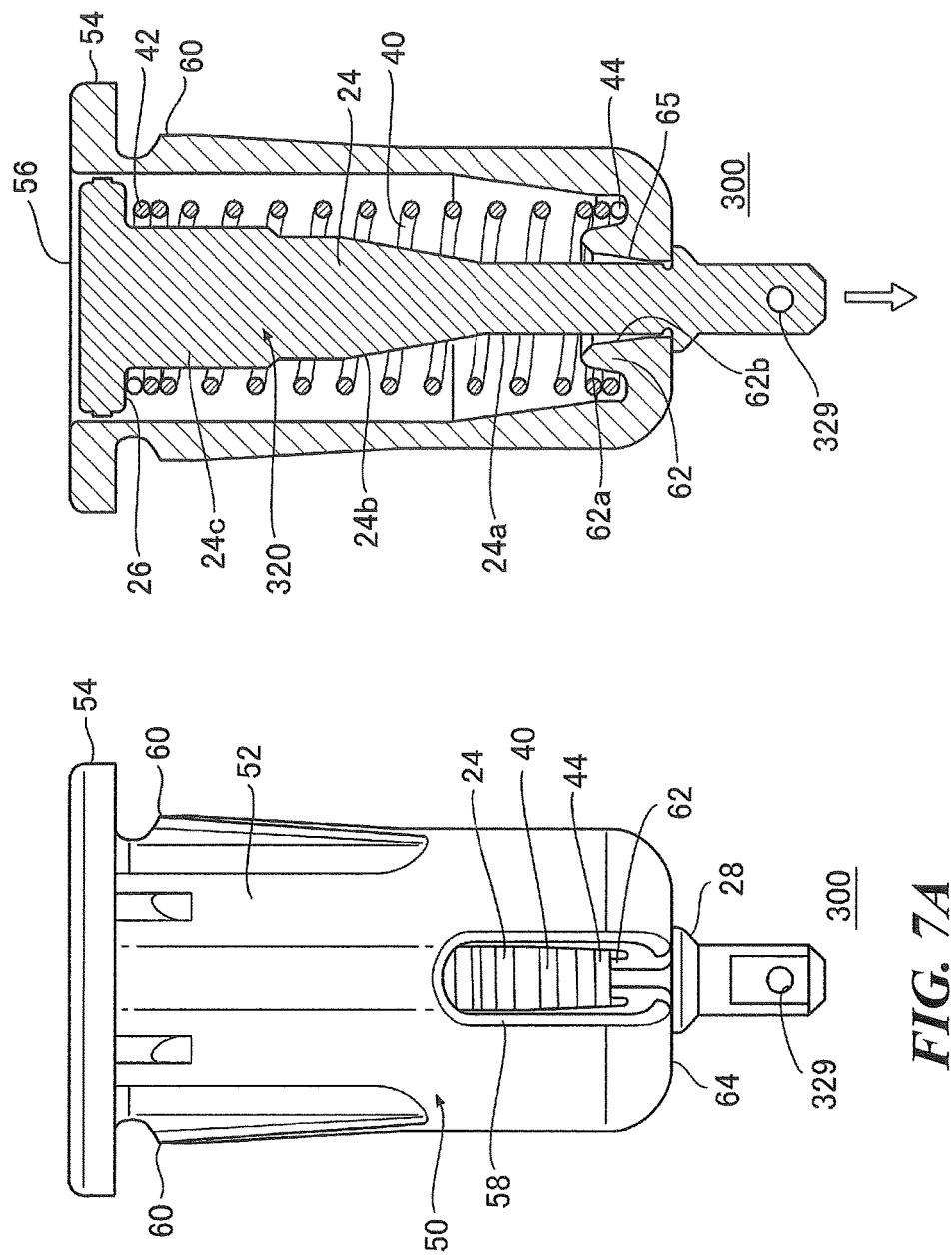

DAMPING DEVICE

TECHNICAL FIELD

The present invention relates to a damping device which absorbs an impact between given members.

BACKGROUND ART

A glove box made up of a box and a lid is provided in a motor vehicle. A damping device is provided on an edge of the box of the glove box and has a function to absorb an impact generated by a collision between the lid and the box by elastic force through abutment with the lid when the lid of the glove box is closed.

A damping device disclosed in Patent Literature 1 includes a case member which is attached to an edge of a box of a glove box, a pin member which is accommodated in the case member and a spring member which urges the pin member. This damping device absorbs an impact generated by a collision between the lid and the box by urging the lid which is brought into abutment with the pin member by the use of the spring member.

PRIOR ART LITERATURE

Patent Literature

Patent Literature 1: WO-2014-024353-A

SUMMARY OF THE INVENTION

Problem that the Invention is to Solve

According to the technique disclosed in Patent Literature 1, the spring member deflects according to the moving amount of the pin member and generates an urging force according to the deflection amount of the spring member. In this damping device, in the event that the spring member is increased in size to increase more the urging force according to the moving amount of the pin member, the overall size of the damping device is enlarged.

The invention has been made in view of the problem described above, and an object of the invention is to provide a damping device which can enhance an urging force which is generated according to the moving amount of a pin member without involving the enlargement in size of the damping device.

Means for Solving the Problem

With a view to solving the problem, an aspect of the invention provides
a damping device including:
a cylindrical case member; and
a pin member which is inserted slidably in the case member,
wherein an end portion of the case member includes:
a hole forming portion which forms an insertion hole through which the pin member is inserted; and
a slit which allows the hole forming portion to be deformed to be enlarged in size,
wherein a tapered portion which slants with respect to an axial direction is formed on at least one of an outer circumferential surface of the pin member and an inner circumferential surface of the hole forming portion, and
wherein the outer circumferential surface of the pin member and the inner circumferential surface of the hole forming member slide via the tapered portion as a result of a movement of the pin member in a direction of being pushed into the insertion hole from an inner side of the case member to thereby forcibly spread the insertion hole.

Advantageous Effects of Invention

According to the invention, it is possible to provide the damping device in which the urging force generated in response to the moving amount of the pin member can be enhanced without enlarging the damping device in size.

BRIEF DESCRIPTION OF DRAWINGS

FIGS. 5A and 5B Views illustrating a damping device of a first modified example.
FIGS. 6A and 6B Views illustrating a damping device of a second modified example.
FIGS. 7A and 7B Views illustrating a damping device of a third modified example.

MODE FOR CARRYING OUT THE INVENTION

Figure 1:
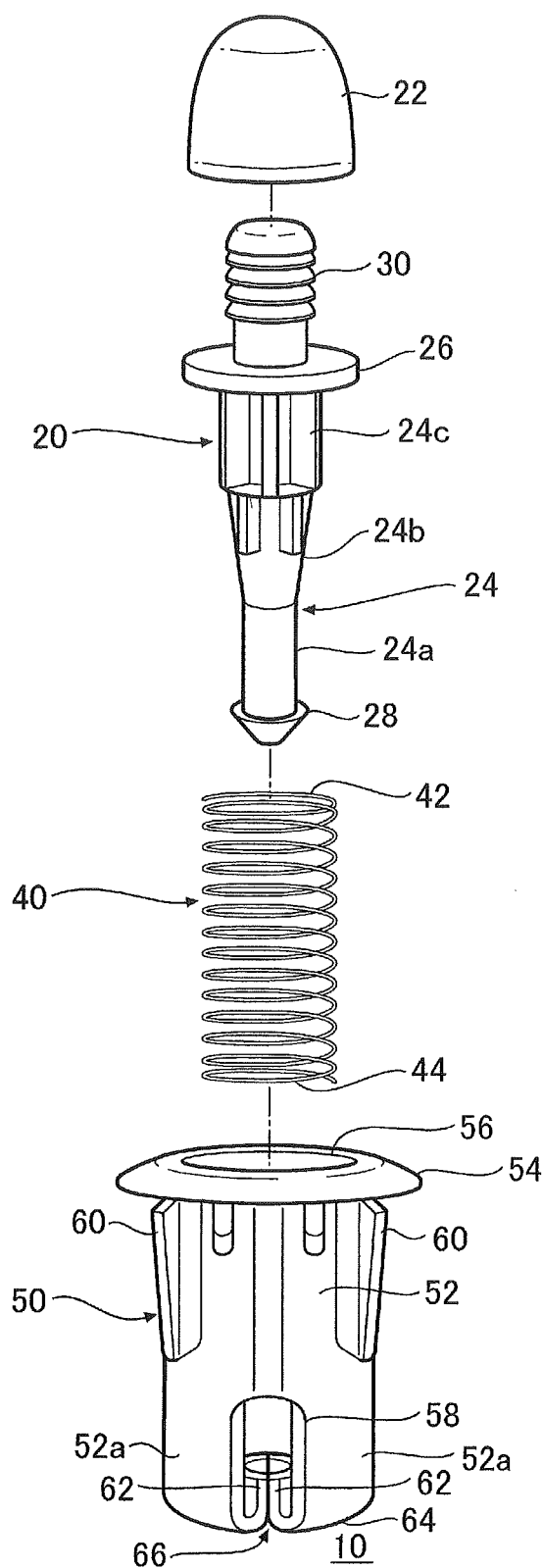
FIG. 1 An exploded view of a damping device according to an embodiment.
Figure 2:
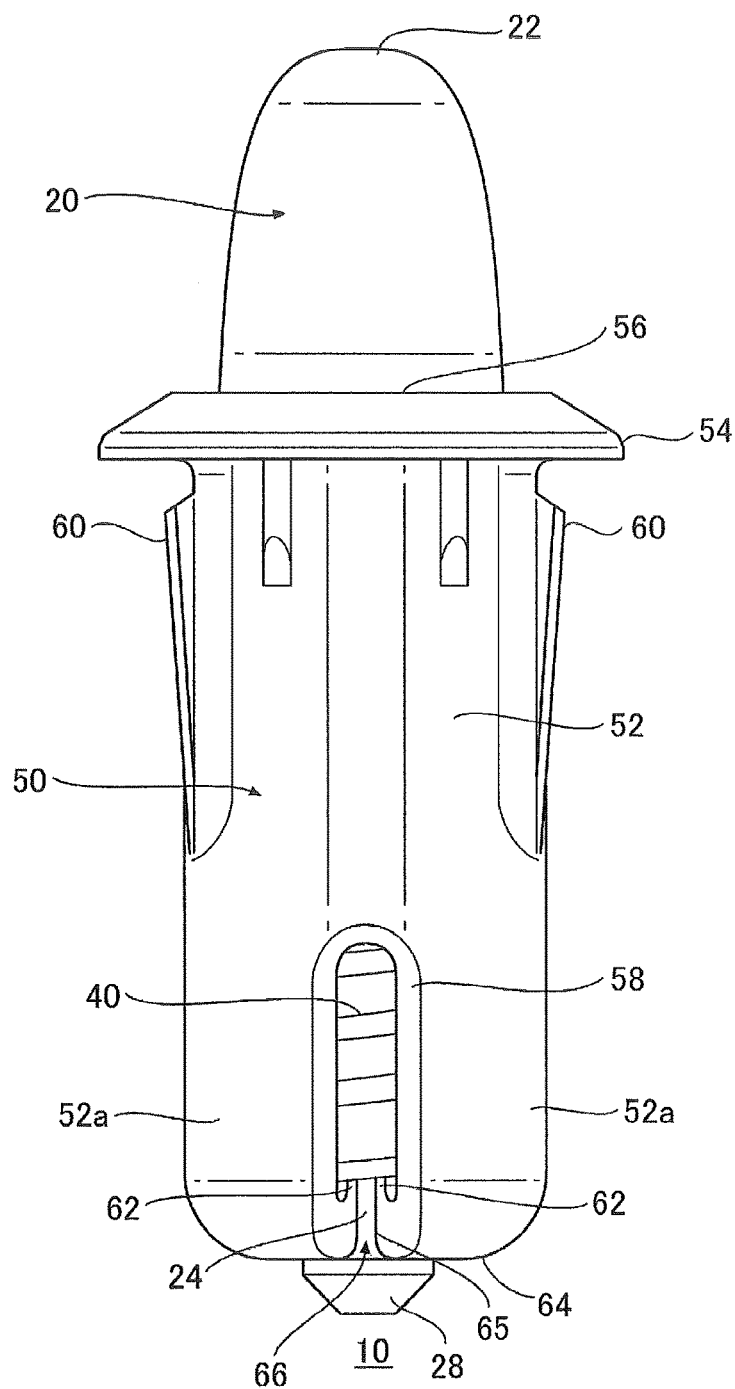
FIG. 2 A front view of the damping device.

FIG. 1 is an exploded view of a damping device 10 according to an embodiment. FIG. 2 is a front view of the damping device 10. Like reference numerals are given to like or equivalent constituent elements or members shown individually in the accompanying drawings, and repeated descriptions thereof will be omitted as required. The damping device 10 is mounted on a mount-base member. The damping device 10 may absorb an impact generated by a collision of a given member with the mount-base member and may mitigate the motion of the given member moving away from the mount-base member. For example, the damping device 10 is mounted on a box of a glove box so as to be brought into abutment with, when a lid of the glove box is closed, a contact surface of the lid. Thus, a collision between the box and the lid can be suppressed. The damping device 10 urges the lid in a direction in which the lid is opened and then assists an opening action of the lid when the lid is unlocked.

A mounting hole is formed at an open edge of the box of the glove box. The damping device 10 is mounted in the mounting hole. The damping device 10 also functions as an urging device which is brought into abutment with a contact surface edge of the lid of the glove box to thereby urge the lid in the direction in which the lid is opened when the lid is closed. The box of the glove box is a mount-base member which is fixed to a vehicle body. The lid thereof is an opening and closing body which can open and close an opening of the box and functions as a damping-subject member. The box of the glove box may be integrated with an instrument panel.

The damping device 10 is made up of a wound coil spring 40, a pin member 20 which is inserted into the coil spring 40 and a case member 50 which accommodates therein the coil spring 40. These members are assembled into one unit.

The pin member 20 is inserted slidably in a main body portion 52. The pin member 20 has a head portion 22 which can be brought into abutment with the damping-subject member, a rod-shaped shaft portion 24 which is connected to the head portion 22 and which has a dislocation preventing portion 28 which is formed at a distal end thereof and a spring bearing portion 26 which is formed into a flange on an end portion of the shaft portion 24 which faces the head portion 22.

The head portion 22 is made of a rubber material and constitutes a separate body which is separated from a main body of the pin member 20 which is made from a plastics material. The head portion 22 is connected to the main body of the pin member 20 by a connecting portion 30. The shaft portion 24 has a small diameter portion 24a having the dislocation preventing portion 28, a tapered portion 24b whose outer circumferential surface is gradually narrowed in diameter as it extends from a large diameter portion 24c towards the small diameter portion 24a and the large diameter portion 24c having the spring bearing portion 26. The large diameter portion 24c is larger in diameter than the small diameter portion 24a. The dislocation preventing portion 28 is formed in such a way that a distal end of the small diameter portion 24a protrudes radially. Outside diameters of the small diameter portion 24a and the large diameter portion 24c are constant, whereas the tapered portion 24b slants along an axial direction.

The case member 50 has a bottomed cylindrical shape and has the main body portion 52 having a cylindrical shape, an opening portion 56 and a flange portion 54 which are formed at an end of the main body portion 52, a bottom portion 64 which is formed at the other end of the main body portion 52 and plural locking portions 60 which are formed on an outer circumferential surface of the main body portion 52. The case member 50 is fixed to an edge of the mounting hole by the locking portions 60 which protrude radially outwards.

The main body portion 52 and the bottom portion 64 are formed into a bifurcated configuration by a slit 58 which is a cut made from a middle position of the main body portion 52 to the bottom portion 64. The slit 58 connects to an insertion hole 66 in the bottom portion 64 and divides the bottom portion 64 and part of the main body portion 52 into two to thereby form a pair of leg pieces 52a.

The bottom portion 64 has a hole forming portion 65 which forms the insertion hole 66 through which the pin member 20 is inserted and projecting portions 62 which project into an inside of the case member 50. In a free state, a bore diameter of the hole forming portion 65 may be substantially the same as an outside diameter of the small diameter portion 24a. The free state of the hole forming portion 65 means a state in which the pair of leg pieces 52a are not opened out. In the event that the hole forming portion 65 is in the free state and is not expanded diametrically, the hole forming portion 65 holds the small diameter portion 24a of the shaft portion 24 in such a way that almost no gap is left therebetween.

The projecting portions 62 are formed so as to project axially inwards from an inner surface of the bottom portion 64. No step is formed between inner circumferential surfaces of the projecting portions 62 and an inner circumferential surface of the hole forming portion 65. The inner circumferential surfaces of the projecting portions 62 and the inner circumferential surface of the hole forming portion 65 lie in a row in a flat manner. The projecting portions 62 are each formed into a semi-circular arc shape. The pair of projecting portions 62 are each formed into a semi-cylindrical shape on each of the pair of leg pieces 52a and define a cylindrical shape as a whole together.

The coil spring 40 is accommodated in the case member 50 so as to surround the shaft portion 24. A first end portion 42 of the coil spring 40 is brought into abutment with the spring bearing portion 26 of the pin member 20 while a second end portion 44 of the coil spring 40 is brought into abutment with the bottom portion 64 of the case member 50. The coil spring 40 urges the pin member 20 in a direction in which the pin member 20 exits from the opening portion 56 such that the head portion 22 of the pin member 20 protrudes from the opening portion 56. As shown in FIG. 2, the pin member 20 urged by the coil spring 40 is prevented from being dislocated from the case member 50 by the dislocation preventing portion 28 being caught at an edge of a front side of the bottom portion 64.

Figure 3:
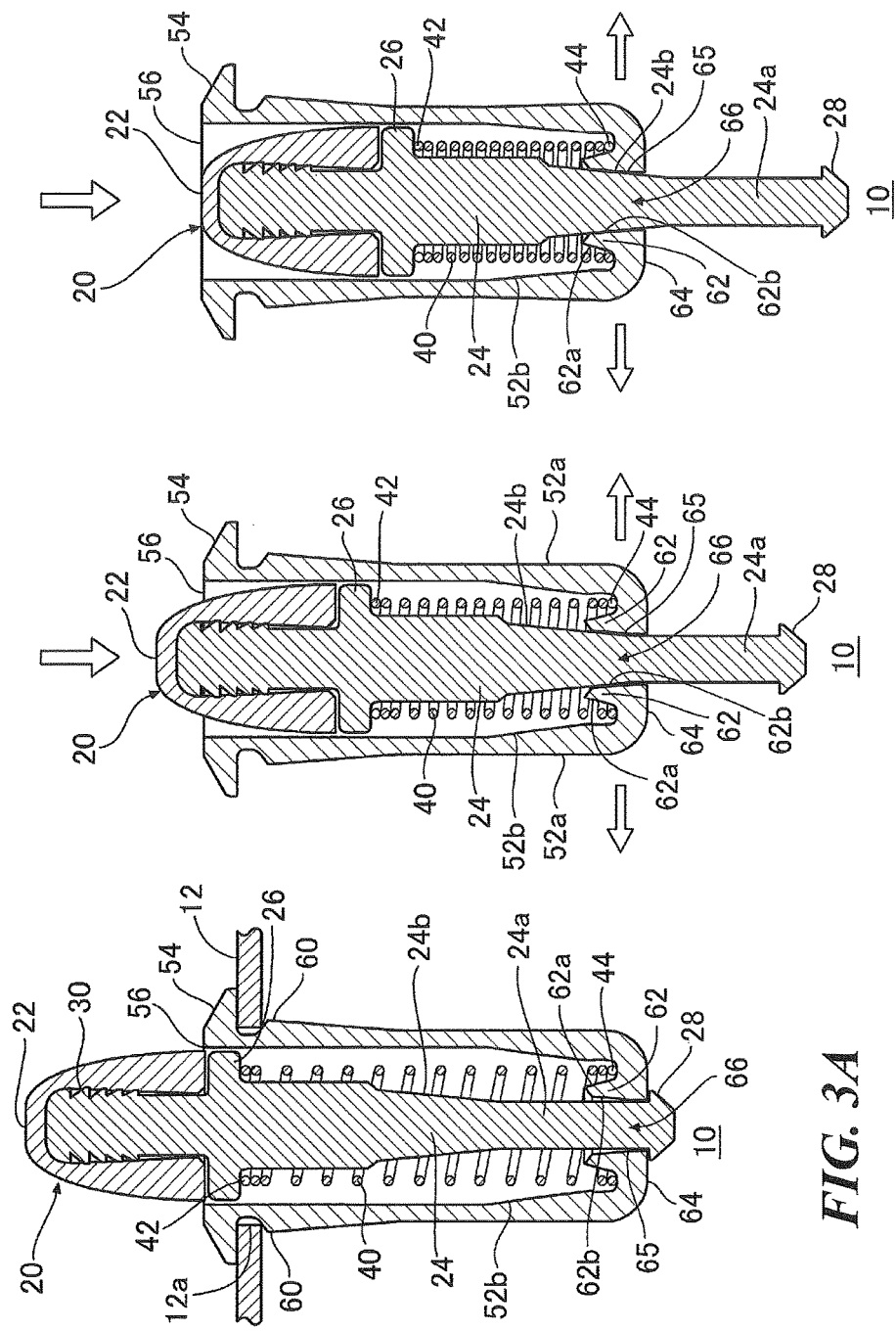
FIGS. 3A to 3C Views illustrating the operation of the damping device.

FIGS. 3A to 3C show views illustrating the operation of the damping device 10. FIGS. 3A to 3C are sectional views of the damping device 10 taken along a center axis thereof, showing sequentially states in which the pin member 20 is pushed in to withdraw. FIG. 3A shows a state in which the damping device 10 is fixed in place in a mounting hole 12a of a mount-base member 12.

As shown in FIG. 3A, the damping device 10 is mounted on the mount-base member 12 by holding an edge of the mounting hole 12a by a rear surface of the flange portion 54 and the plural locking portions 60 therebetween. In the main body portion 52, portions which lie on both sides of the locking portions 60 are formed thinner than the other portions, so that the locking portions 60 deflect radially inwards. Thus, the locking portions 60 deflect when the damping device 10 is inserted into the mounting hole 12a to be mounted on the mount-base member 12.

In the event that the damping device 10 is pushed into the mounting hole 12a of the mount-base member 12, the locking portions 60 deflect, allowing the damping device 10 to be mounted in the mounting hole 12a. Thus, the mounting work is facilitated. Since the locking portions 60 are formed integrally with the main body portion 52 via the thin portions without free ends, the locking portions 60 can be prevented from excessively deflecting inwards so as not to be caught on the coil spring 40 or the like.

The dislocation preventing portion 28 is caught on the edge of the hole forming portion 65 to be held thereat. In its free state, the hole forming portion 65 is formed smaller in diameter than the dislocation preventing portion 28. An outside diameter of the case member 50 can be made smaller by disposing the dislocation preventing portion of the pin member 20 at the bottom portion 64 of the case member 50 than when the dislocation preventing portion of the pin member 20 is disposed on a side surface of the case member 50. In this way, the damping device 10 has a simple configuration made up of the rod-shaped shaft portion 24, the coil spring 40 which surrounds the shaft portion 24 and the case member 50 which surrounds the coil spring 40, and therefore, the outside diameter of the main body portion 52 of the damping device 10 can be reduced, thereby making the damping device 10 smaller in size.

The insertion hole 66 in the bottom portion 64 can be deformed to be enlarged by the slit 58. In assembling the pin member 20 into the case member 50, the shaft portion 24 of the pin member 20 is pushed through the insertion hole 66. As this occurs, since the dislocation preventing portion 28 is larger in diameter than the insertion hole 66, the plural leg pieces 52a are forced to spread. Then, when the plural leg pieces 52a spread, the insertion hole 66 defined at distal ends of the leg pieces 52a are deformed to be enlarged. When the dislocation preventing portion 28 passes through the insertion hole 66, the leg pieces 52a close and the insertion hole 66 narrows diametrically to be restored to its original state. In this way, the pin member 20 can easily be assembled only by pushing the pin member 20 through the insertion hole 66.

As shown in FIG. 3A, the coil spring 40 is accommodated in the case member 50, and in the pin member 20, the shaft portion 24 is accommodated in the case member 50 with the head portion 22 protruding to the outside of the case member 50. The second end portion 44 of the coil spring 40 is brought into abutment with an inner surface of the bottom portion 64. This can ensure a sufficient spring length.

The second end portion 44 of the coil spring 40 is disposed so as to surround the outside of the pair of projecting portions 62 and is disposed between outer circumferential surfaces 62a of the projecting portions 62 and an inner circumferential surface of the main body portion 52. The projecting portions 62 are inserted into the second end portion 44 of the coil spring 40. This can suppress the occurrence of a radial deviation of the coil spring 40.

As shown in FIG. 3B, when closing the lid of the glove box, the lid is brought into abutment with the head portion 22. Then, the pin member 20 is caused to withdraw into the case member 50 against the urging force of the coil spring 40. The case member 50 is fixed, and the pin member 20 moves relative to the case member 50 and continues so moving until the pin member 20 protrudes out of the insertion hole 66. As a result of the pin member 20 moving in that way, a portion of the shaft portion 24 which resides inside the insertion hole 66 changes from the small diameter portion 24a to the tapered portion 24b.

When the pin member 20 moves so as to exit outwards from the insertion hole 66, the tapered portion 24b of the pin member 20 is brought into abutment with an inner circumferential surface of the hole forming portion 65 to spread the pair of leg pieces 52a, whereby the insertion hole 66 is forced to spread. The outer circumferential surface of the pin member 20 and the inner circumferential surface of the hole forming portion 65 slide on each other via the tapered portion, whereby the insertion hole 66 is caused to spread. As shown in FIG. 3C, when the pin member 20 is pushed in further, the pair of leg pieces 52a are caused to spread further, whereby the insertion hole 66 is caused to spread in diameter. The sliding of the outer circumferential surface of the pin member 20 and the inner circumferential surface of the hole forming portion 65 via the tapered portion includes: a sliding of the outer circumferential surface of the pin member 20 on the inner circumferential surface of the tapered hole forming portion 65; and/or a sliding of the inner circumferential surface of the hole forming portion 65 on the tapered portion 24b of the pin member 20.

The second end portion 44 of the coil spring 40 is disposed so as to surround the projecting portions 62, and this can prevent the coil spring 40 from being dislocated from the bottom portion 64 to fall through the insertion hole 66 when the pair of leg pieces 52a spread.

The pair of leg pieces 52a urge the tapered portion 24b radially inwards as they spread away from each other. The urging force of the leg pieces 52a can be divided into a component which urges the pin member 20 to exit from the opening portion 56 and a component which increases a frictional force between the tapered portion 24b and the leg pieces 52a. Thus, as the pair of leg pieces 52a are caused to spread by the tapered portion 24b, a resisting force of the pin member 20 in relation to a moving amount thereof is increased. When the pair of leg pieces 52a spread away from each other, the frictional force and a force which pushes back the pin member 20 are added to the urging force of the coil spring 40, and a load characteristic of the pin member 20 in relation to the moving amount thereof changes greatly. A change rate of the resisting force of the damping device 10 which changes according to the moving amount of the pin member 20 can be changed by the leg pieces 52a which spread.

Figure 4:
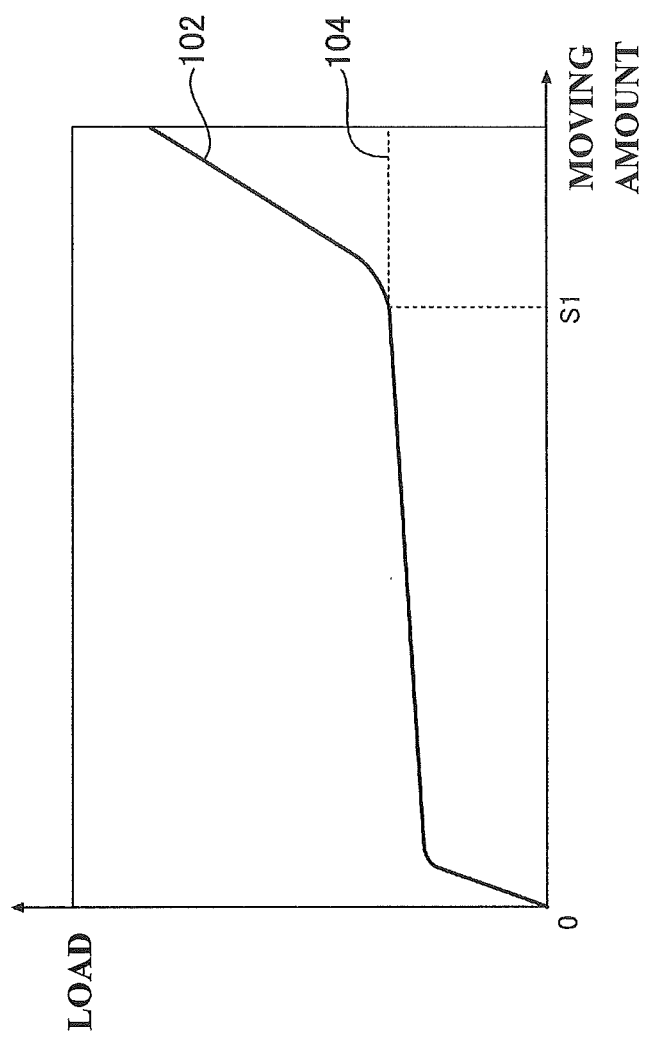
FIG. 4 A graphical view illustrating a relationship between a moving amount of a pin member and load in the damping device.

FIG. 4 is a graphical view illustrating a relationship between a moving amount of the pin member 20 and load applied thereby according to the moving amount. In FIG. 4, an axis of abscissa denotes a moving amount of the pin member 20, and an axis of ordinate denotes a load (a resisting force) generated by the damping device 10. Namely, the damping device 10 imparts a load according to the moving amount of the pin member 20 shown in FIG. 4 to the lid of the glove box which pushes in the pin member 20 and mitigates a speed at which the lid is closed. A state in which the moving amount of the pin member 20 is zero is a state in which the damping device 10 is free.

The small diameter portion 24a stays within the hole forming portion 65. Thus, the pin member 20 is urged only by the urging force of the coil spring 40 until the moving amount of the pin member 20 changes from zero to S1, and the load changing according to the moving amount of the pin member 20 increases linearly.

When the moving amount of the pin member 20 reaches S1, the tapered portion 24b starts to be pushed into the hole forming portion 65, and a load generated by the spreading leg pieces 52a is added to the urging force of the coil spring 40.

As indicated by a load characteristic 102 shown in FIG. 4, in the damping device 10, in an initial stage of pushing in the pin member 20, the load is generated linearly in the pin member 20 only by the coil spring 40. Then, when the pin member 20 continues to be pushed in, causing the tapered portion 24b to slide on the hole forming portion 65 to spread the leg pieces 52a, the load exhibited by the damping device 10 can be increased drastically. A change rate of the load increases drastically from the moving amount S1 where the leg pieces 52a start to spread compared with the linear load characteristic 104 where the pin member 20 is urged only by the urging force of the coil spring 40 shown in FIG. 4. In this way, according to the damping device 10, in closing the lid of the glove box, when the lid approaches the box to increase the displacement of the pin member 20 to the moving amount S1 or greater, the damping device 10 increases the load drastically to mitigate the motion of the lid, thereby more effectively suppressing striking noise which would otherwise be generated by the contact of the lid and the box. With the lid of the glove box closed, the pin member 20 of the damping device 10 is in abutment with the lid in a state where the pair of leg pieces 52a spread away from each other, thereby suppressing rattling of the lid.

When the pair of leg pieces 52a spread away from each other, the second end portion 44 of the coil spring 40 is brought into abutment with the outer circumferential surfaces of the pair of projecting portions 62 and acts to suppress the expansion in diameter of the coil spring 40. This can increase more the change rate of the resisting force in relation to the moving amount of the pin member 20. When the pair of leg pieces 52a spread repeatedly over time, the second end portion 44 urges the pair of leg pieces 52a in a direction in which the spreading of the leg pieces 52a is suppressed. Thus, collapse of the leg pieces 52a can be prevented, thereby suppressing the performance degradation over time.

FIGS. 3A to 3C are referred to again. The outer circumferential surfaces 62a of the projecting portions 62 are formed so as to narrow in diameter axially inwards. Inner circumferential surfaces 62b of the projecting portions 62 are formed so as to expand in diameter axially inwards. Namely, the projecting portions 62 are formed so as to taper from their roots to distal ends.

A tapered portion which slants with respect to the axial direction is formed on the inner circumferential surfaces of the projecting portions 62 and the hole forming portion 65. The inner circumferential surfaces of the projecting portions 62 and the hole forming portion 65 are formed into a tapered configuration such that a bore diameter defined therein expands axially inwards. Thus, when the pin member 20 moves in a direction in which the pin member 20 exits from the hole forming portion 65, the pin member 20 is brought into abutment with the insertion hole 66, and the insertion hole 65 is then expanded in diameter.

The projecting portions 62 are provided in a circumferential direction and the outer circumferential surfaces 62a slant so as to approach the center axis thereof as they extend in the protruding direction. The outer circumferential surfaces 62a of the projecting portions 62 are tapered. Thus, as the pair of leg pieces 52a spread away from each other, the number of turns of the coil spring 40 which come into contact with the outer circumferential surfaces 62a of the projecting portions 62 is increased, thereby increasing the resisting force of the coil spring 40 which prevents the pair of leg pieces 52a from spreading away from each other.

A sloping surface 52b is formed on the inner circumferential surface of the main body portion 52, and this sloping surface 52b narrows in diameter as it extends from the end where the opening portion 56 is formed to the end where the bottom portion 64 is formed. The sloping surface 52b functions as a guide which guides the insertion of the coil spring 40.

FIGS. 5A and 5B show views illustrating a damping device 100 of a first modified example. In the damping device 100 of the first modified example, the shape of a coil spring 140 differs from that of the coil spring 40 of the damping device 10 shown in FIGS. 3A to 3C. An axial length of a tapered portion 124b is formed longer than the tapered portion 24b of the shaft portion 24 shown in FIG. 3.

The damping device 100 of the first modified example is made up of a pin member 20, the coil spring 140 and a case member 50. The coil spring 140 is wound twice. The coil spring 140 may be wound once. This coil spring 140 is not intended to urge the pin member 20 but is provided to prevent a pair of leg pieces 52a from spreading away from each other.

Plural projecting portions 153 are formed on an inner circumferential surface of the case member 50 to restrict an axial movement of the coil spring 140. The plural projecting portions are disposed in a circumferential direction and project radially inwards from the inner circumferential surface of the case member 50. The axial movement of the coil spring 140 is restricted by a bottom portion 64 and the projecting portions 153. The coil spring 140 is disposed between outer circumferential surfaces of projecting portions 62 and the inner circumferential surface of the case member 50 to thereby be restricted from moving in a radial direction.

A shaft portion 124 of the pin member 20 has a tapered portion 124b which gradually narrows in diameter from a large diameter portion 124a to a dislocation preventing portion 28. When the pin member 20 moves in a direction in which the pin member 20 exits from an insertion hole 66, the tapered portion 124b slides on a hole forming portion 65 from the start of the movement and forces the hole forming portion 65 to spread in diameter. Thus, a pair of leg pieces 52a spread away from each other. This can impart a load according to the movement of the pin member 20 to the pin member 20. As a result of the coil spring 140 functioning to prevent the leg pieces 52a from spreading, the load generated according to the movement of the pin member 20 is increased, thereby suppressing collapse of the pair of leg pieces 52a.

FIGS. 6A and 6B show views illustrating a damping device 200 of a second modified example. The damping device 200 of the second modified example is such that the coil spring 140 is removed from the damping device 100 of the first modified example and is made up of a pin member 20 and a case member 50.

In the second modified example, a shaft portion 224 of the pin member 20 has a tapered portion 224b which gradually narrows in diameter from a large diameter portion 224a to a dislocation preventing portion 28. When the pin member 20 moves in a direction in which the pin member 20 exits from an insertion hole 66, the tapered portion 224b slides on a hole forming portion 65 from the start of the movement and forces the hole forming portion 65 to spread in diameter. Thus, a pair of leg pieces 52a spread away from each other. This can impart a load according to the movement of the pin member 20 to the pin member 20 while suppressing the production costs and without using the coil spring 40.

FIGS. 7A and 7B show views illustrating a damping device 300 of a third modified example. When compared with the damping device 10 shown in FIG. 1, the damping device 300 of the third modified example differs from the damping device 10 in that a head portion is not provided on a pin member 320 and that the pin member 320 does not exit from an opening portion 56 of a case member 50. The pin member 320 has a connecting portion 329 which projects from an insertion hole 66, and the connecting portion 329 receives an input from an exterior portion. Namely, the damping device 300 of the third modified example 300 differs from the damping device 10 shown in FIG. 1 in a method of inputting.

The pin member 320 has a shaft portion 24, a flange-shaped spring bearing portion 26 which is formed at one end of the shaft portion 24, and a dislocation preventing portion 28 and the connecting portion 329 which are formed at the other end of the shaft portion 24. The dislocation preventing portion 28 and the connecting portion 329 are provided in a state where they lie out of the insertion hole 66. For example, by connecting the connecting portion 329 to a lid of a glove box, the opening speed of the lid which opens on its own weight can be mitigated.

Figure 8A:
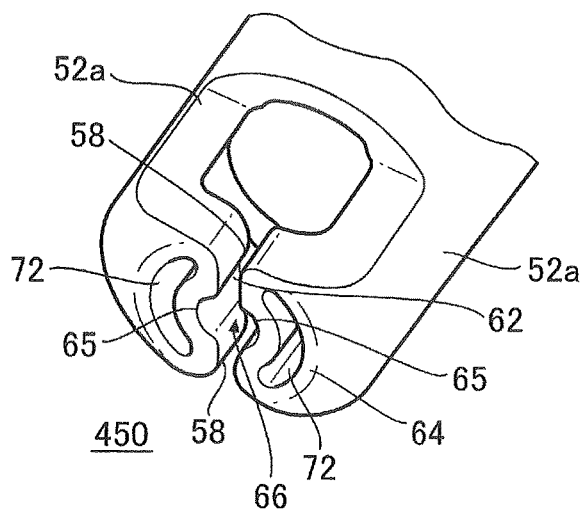
FIGS. 8A to 8C Views illustrating a case member of a further modified example.
Figure 8B:
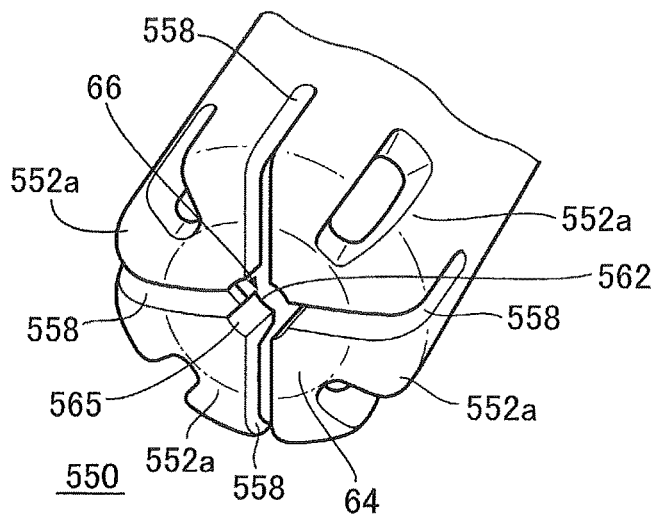
Figure 8C:
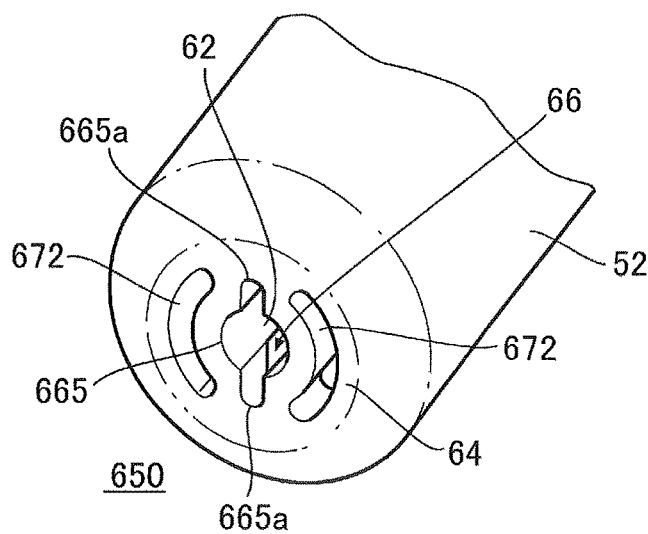

FIGS. 8A to 8C show views illustrating a case member of a modified example. FIGS. 8A to 8C mainly show portions or bottom portions of case members. The case members of the modified examples may be combined with the damping device 10 or the damping devices of the modified examples.

A hole forming portion 65 of a case member 450 of a fourth modified example shown in FIG. 8A differs from the form of the damping device 10 shown in FIGS. 3A to 3C in that arc-shaped void portions 72 are formed on the circumference of the hole forming portion 65. The void portions 72 are formed in a bottom portion 64 so as to surround the hole forming portion 65. The void portions 72 facilitates a spreading deformation of the hole forming portion 65, and therefore, it can be set so that the spreading of leg pieces 52a is suppressed by reducing an axial length of a slit 58.

In a case member 550 of a fifth modified example shown in FIG. 8B, four leg pieces 552a are formed by four slits 558. This can facilitate the spreading of the leg pieces 552a by increasing the number of slits 558. Four projecting portions 562 are also formed in accordance with the number of leg pieces 552a.

FIG. 8C shows a case member 650 of a sixth modified example in which neither slits nor leg pieces are formed but arc-shaped void portions 672 are forming on the circumference of a hole forming portion 665 to thereby allow an insertion hole 66 to be deformed to spread. Plural void portions 672 are formed in a bottom portion 64 so as to surround the hole forming portion 665. The hole forming portion 665 has cut portions 665a which extend radially from a circular portion. Two cut portions 665a are formed in a facing manner between the two void portions 672. The insertion hole 66 can easily be deformed to spread by the cut portions 665a so formed. Since the bottom portion 64 is not configured to spread, a second end portion 44 of a coil spring 40 which is supported on an inner surface of the bottom portion 64 can be prevented from being dislocated.

The invention is not limited to the embodiment described above, and hence, various modifications in design can be made to the embodiment based on the knowledge of those skilled in the art to which the invention pertains, and embodiments to which such modifications are made can also be included in the scope of the invention. The modified examples can be combined together as required.

In the embodiment, while the damping device 10 is described as being mounted on the box of the glove box, the invention is not limited thereto. For example, the damping device 10 may be mounted on the lid, so that the damping device 10 is brought into the edge of the box when the lid is closed to absorb an impact.

While the head portion 22 is described as being formed of the rubber material as the separate member from the pin member 20 in FIG. 1, the invention is not limited thereto. For example, the head portion 22 and the shaft portion 24 may be formed integrally from a plastic material. The head portion 22 may be formed from a plastic material as a separate member from the shaft portion 24.

In the embodiment, while the projecting portions 62 are described as being formed into the arc-like configuration in section, the invention is not limited thereto. For example, plural projecting portions may be formed so as to be spaced away in a circumferential direction on the edge of the hole forming portion 65. The projecting portions 62 may be projections which prevent the dislocation of the second end portion 44 of the coil spring 40.

DESCRIPTION OF REFERENCE NUMERALS AND SIGNS

10 Damping device
12 Mount-base member
12a Mounting hole
20 Pin member
22 Head portion
24 Shaft portion
24a Small diameter portion
24b Tapered portion
24c Large diameter portion
26 Spring bearing portion
28 Dislocation preventing portion
30 Connecting portion
40 Coil spring
42 First end portion
44 Second end portion
50 Case member
52 Main body portion
52a Leg piece
52b Sloping surface
54 Flange portion
56 Opening portion
58 Slit
60 Locking portion
62 Projecting portion
62a Outer circumferential surface
62b Inner circumferential surface
64 Bottom portion
65 Hole forming portion
66 Insertion hole

INDUSTRIAL APPLICABILITY

The present invention relates to a damping device which absorbs an impact between given members.

The invention claimed is:

1. A damping device, including:
   a cylindrical case member;
   a pin member which is inserted slidably in the case member; and
   a coil spring which is accommodated in the case member and through which the pin member is inserted,
   wherein an end portion of the case member includes:
      a hole forming portion which forms an insertion hole through which the pin member is inserted; and
      a slit which allows the hole forming portion to be deformed to be enlarged in size,
   wherein a tapered portion which slants with respect to an axial direction of the case member is formed on at least one of an outer circumferential surface of the pin member and an inner circumferential surface of the hole forming portion,
   wherein the outer circumferential surface of the pin member and the inner circumferential surface of the hole forming portion slide via the tapered portion as a result of a movement of the pin member in a direction of being pushed into the insertion hole from an inner side of the case member to thereby forcibly spread the insertion hole,
   wherein a wound end portion of the coil spring is supported by the end portion of the case member,
   wherein the end portion of the case member further includes a projecting portion which projects inwards of the case member axial direction, the projecting portion extending inside the coil spring, and
   wherein the projecting portion defines the inner circumferential surface of the hole forming portion.

2. The damping device of claim 1, wherein the tapered portion is located on the outer circumferential surface of the pin member and the inner circumferential surface of the hole forming portion.

3. The damping device of claim 1, wherein the tapered portion is located on the outer circumferential surface of the pin member.

4. The damping device of claim 3, wherein, in the tapered portion, the outer circumferential surface of the pin member gradually reduces in diameter as the tapered portion extends towards the end portion of the case member.

5. The damping device of claim 3, wherein, as the result of the movement of the pin member, the tapered portion of the pin member abuts the inner circumferential surface of the hole forming portion to spread the insertion hole.

6. The damping device of claim 1, wherein the tapered portion is located on the inner circumferential surface of the hole forming portion.

7. The damping device of claim 1, wherein, as the result of the movement of the pin member, the pin member protrudes to outside of the case member.

8. The damping device of claim 1, wherein, as the result of the movement of the pin member, the pin member moves in the axial direction and exits from the insertion hole.

9. A damping device, including:
   a cylindrical case member;
   a pin member which is inserted slidably in the case member;
   a coil spring which is accommodated in the case member and through which the pin member is inserted,
   wherein an end portion of the case member includes:
      a hole forming portion which forms an insertion hole through which the pin member is inserted; and
      a slit which allows the hole forming portion to be deformed to be enlarged in size,
   wherein a tapered portion which slants with respect to an axial direction is formed on at least one of an outer circumferential surface of the pin member and an inner circumferential surface of the hole forming portion,
   wherein the outer circumferential surface of the pin member and the inner circumferential surface of the hole forming portion slide via the tapered portion as a result of a movement of the pin member in a direction of being pushed into the insertion hole from an inner side of the case member to thereby forcibly spread the insertion hole,
   wherein the end portion of the case member further includes:
      a projecting portion which projects inwards of the case member in the axial direction,
   wherein a wound end portion of the coil spring is disposed so as to surround the projecting portion, and
   wherein the projecting portion is brought into abutment with an inner circumferential side of the coil spring when the insertion hole is spread forcibly.

10. The damping device of claim 9, wherein the projecting portion is provided along a circumferential direction and slants such that an outer circumferential surface approaches a center axis as the projecting portion projects.

* * * * *